United States Patent [19]

Noggle

[11] Patent Number: 4,708,546
[45] Date of Patent: Nov. 24, 1987

[54] ROTATING CUTTING TOOL HOLDER FOR BIT GENERATION

[75] Inventor: Kenneth G. Noggle, W. Bloomfield, Mich.

[73] Assignee: GTE Valeron Corporation, Troy, Mich.

[21] Appl. No.: 946,230

[22] Filed: Dec. 24, 1986

[51] Int. Cl.⁴ .................... B23C 3/05; B23C 5/16
[52] U.S. Cl. ...................... 409/200; 82/1 A; 82/1.4; 408/153; 408/159; 409/232; 409/234
[58] Field of Search .............. 82/1 A, 1.2, 1.3, 1.4; 409/200, 231–234, 144; 408/158, 153, 159, 160, 172, 146, 147

[56] References Cited

U.S. PATENT DOCUMENTS 2,157,248  5/1939  Swanson ........................... 82/1.4
3,477,319  11/1969  Koppelmann ................. 408/153 X
3,902,386  9/1975  Dressler ......................... 408/158 X

FOREIGN PATENT DOCUMENTS 539381  2/1956  Italy ............................... 408/158

Primary Examiner—Gil Weidenfeld
Assistant Examiner—Steven C. Bishop
Attorney, Agent, or Firm—David J. Koris

[57] ABSTRACT

A rotary cutting tool holder and method for precise generation of a radial cutting bit under high speed settings includes a rotary housing having an axially mounted actuating bar, a cylindrical shank with attached cutting bit rotatably mounted in a second recess within the housing and extending outwardly from the bar axis. Coupling and engaging means are matingly disposed on the bar and shank for translating axial actuating bar movement into rotational shank movement for radial generation of the cutting bit.

7 Claims, 10 Drawing Figures

ROTATING CUTTING TOOL HOLDER FOR BIT GENERATION

FIELD OF THE INVENTION

The present invention relates to high speed rotating cutting tools and more particularly to cutting tools in which cutting bits are rotatingly generated within a rotary housing in response to axial actuating bar movement.

BACKGROUND OF THE INVENTION

High speed rotary cutting tools capable of generating high quality work piece of varying diameters are generally known. For example, in the manufacture of valve seats for combustion engines, a circular seat with a gradually changing diameter is required for effecting adequate valve seating. A number of tools are available for accomplishing this task. Included are automated tools which rely on axially driven actuating bars. For example, Heuser, U.S. Pat. No. 3,025,729, discloses an automatic boring tool which employs a lever mechanism within a rotary housing which when engaged by an axially oriented drawbar, drives a slidably mounted tool bit radially outward. Faugli, et al, U.S. Pat. No. 3,477,340, employs a milling cutter and a support shank tiltably supported in a spindle. The cutting insert is radially directed by the rotation of a cylindrical shell surrounding the shank. As the shell rotates, the inclined planes of the shell cause only one side of the shell to rise thereby tilting the shank and radially extending the connected cutting insert.

A number of problems exist with the beforementioned high speed rotational cutters used in the production of valve seats that frequently operate at a turning speed of 500 rpm to 3000 rpm. An extension of a cutting bit radially typically creates a moment arm which destabilizes the tool. At an average rotating speed of 3000 rpm, a cutting insert weighing approximately 0.2 pounds generated a distance of 1 to 5 millimeters, creates approximately 60 to about 70 pounds of radially directed force. A high speed rotational cutting tool which provides automated radial cutter generation without the formation of an excess moment arm is therefore a highly desirable advance in the art of high speed rotating cutting tools.

Another object of the present invention is to facilitate reversible generation of a high speed cutting tool while at the same time, minimizing vibration and chatter.

Another object is to reversibly generate a cutting tool a predetermined distance along a workpiece with a high degree of accuracy and repeatability.

A further object of the present invention is to provide a high speed rotary cutting tool capable of generating a cutting edge over a substantial radial distance and produce a fine finish turning. Other objects will become apparent to those skilled in the art upon review of the specifications, claims and drawings.

SUMMARY OF THE INVENTION

In accordance with the present invention, a rotary cutting tool is provided which comprises a housing rotatable about an axis having a first longitudinal recess concentric with the axis and a second recess which intersects the first recess for support and alignment of a longitudinally mounted actuating bar. The bar has a forwardly disposed coupling means for communication with a tool shank rotatably mounted in the second recess. The shank has cutting means disposed on its forward end and rearwardly disposed engaging means for mating connection with the coupling means. Means are also provided for retaining the shank within the second recess to prevent premature removal during operation.

The present invention also provides a method for generating cutting means across a work piece by displacing an actuating bar axially within a rotary housing to a shank in a second cylindrical recess. Cutting means mounted on the shank are radially generated by the translation of longitudinal bar movement into rotational motion via forwardly mounted coupling means and matingly connected engaging means.

One advantage of the device as described above is the ability to perform highly precise generation of the cutting means at high speed without the formation of a destabilizing moment arm. By rotating the shank within the second recess the cutting means is generated a distance depending in part on the shank diameter and its orientation with respect to the rotational axis of the housing. As the mass of the shank and cutter remains essentially constant in relation to the housing axis, destabilize forces are minimized.

Another advantage of the device lies in the ability to repeatably generate a predetermined surface configuration with a high degree of accuracy. The use of an longitudinally driven actuator bar in conjunction with a rotationally driven cutting shank greatly simplifies the mechanism for achieving controlled cutting edge movement. Accuracy is enhanced and the destructive attributes characteristic of high speed cutting tools with pronounced moment arms are avoided.

BRIEF DESCRIPTION OF THE DRAWINGS

The objects, features and advantahes of the present invention will be clearly understood to those skilled in the art by reference to this disclosure and the attached drawings in which.

DETAILED DESCRIPTION OF A PREFERRED EMBODIMENT

Figure 1:
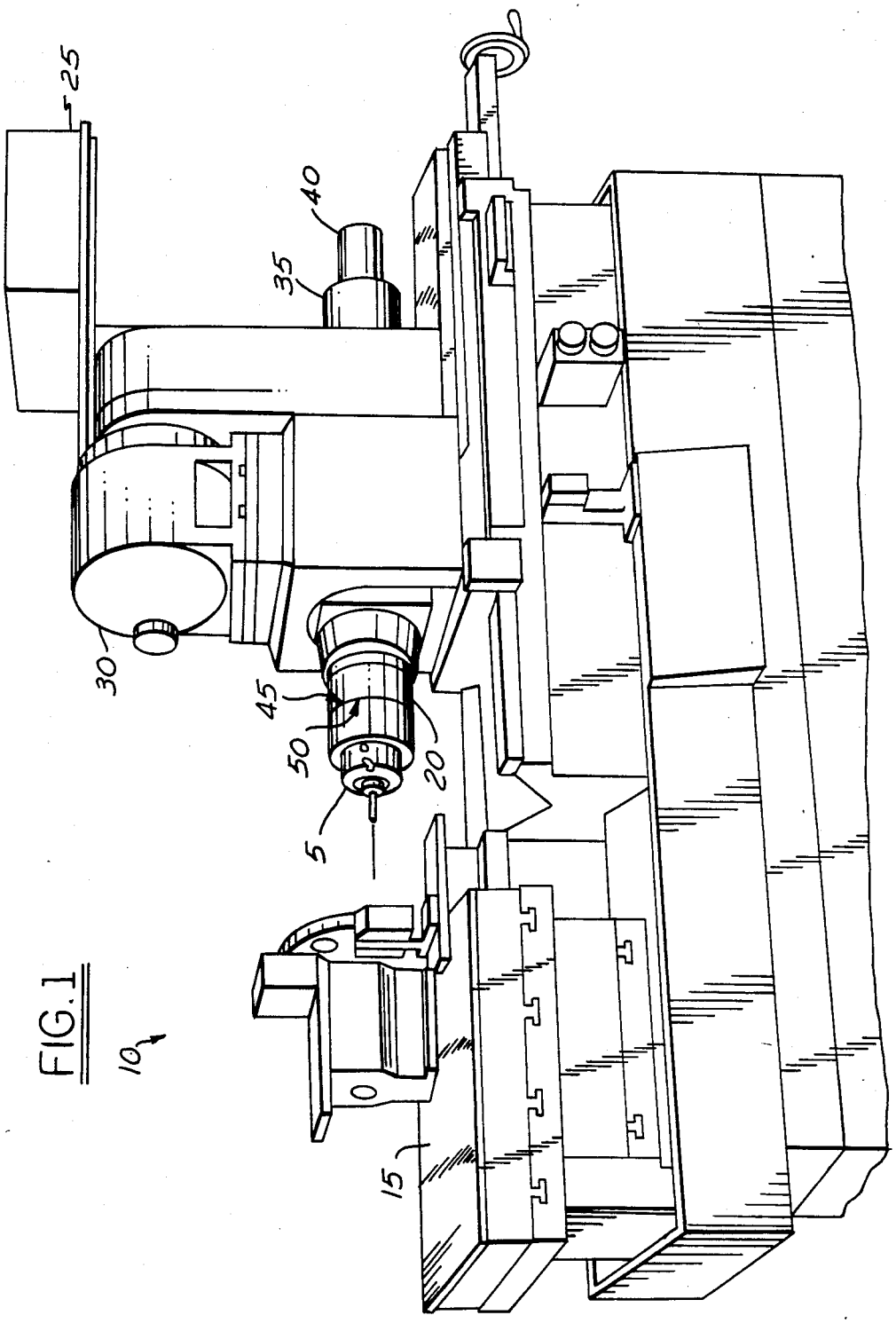
FIG. 1 is a perspective view of a milling or boring machine incorporating the cutting tool of the present invention.

FIG. 1 broadly depicts a rotary cutting tool 5 as it would appear in a numerically controlled system. The system includes a rotary cutting apparatus 10 having a base support 15, a drive spindle 20 and an encoder 25. Drive spindle 20 is rotated in a known manner by motor 30 and a belt and pulley arrangement, not shown. A drawbar (not shown) is present within spindle 20 and is moved axially by auto size module 35 and end stop motor 40. Ones skilled in the art will recognize that other drive means such as a hydraulic cylinder may be employed without departing from the scope of this invention. The drawbar may be keyed to spindle 20 to facilitate both axial and rotational movement.

Rotary cutting tool 5 is attached to and rotated by spindle 20 through bolt members (not shown) abutting spindle flange 45, and complementary housing flange 50. It is to be understood that other means for quick change tool locking devices are commonly known to those skilled in the art and therefore will not be discussed further. The use of rotary spindles in numerically controlled systems is also commonly known in the art. Smelewski, U.S. Pat. No. 3,740,161, assigned to GTE Corporation, describes one such numerically controlled system and is incorporated herein by reference.

Figure 2:
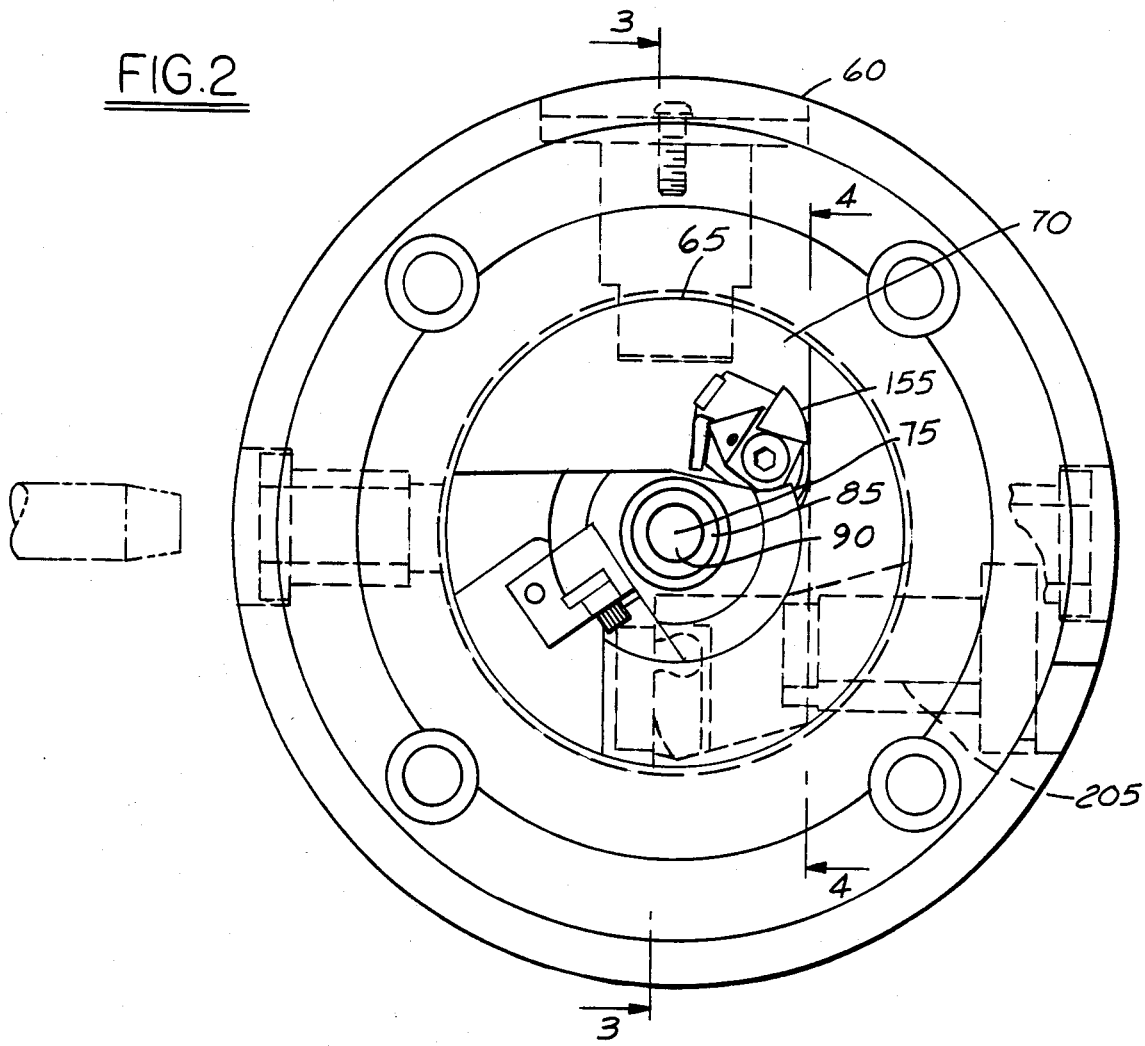
FIG. 2 is an elevated end view of the cutting tool of FIG. 1.
Figure 3:
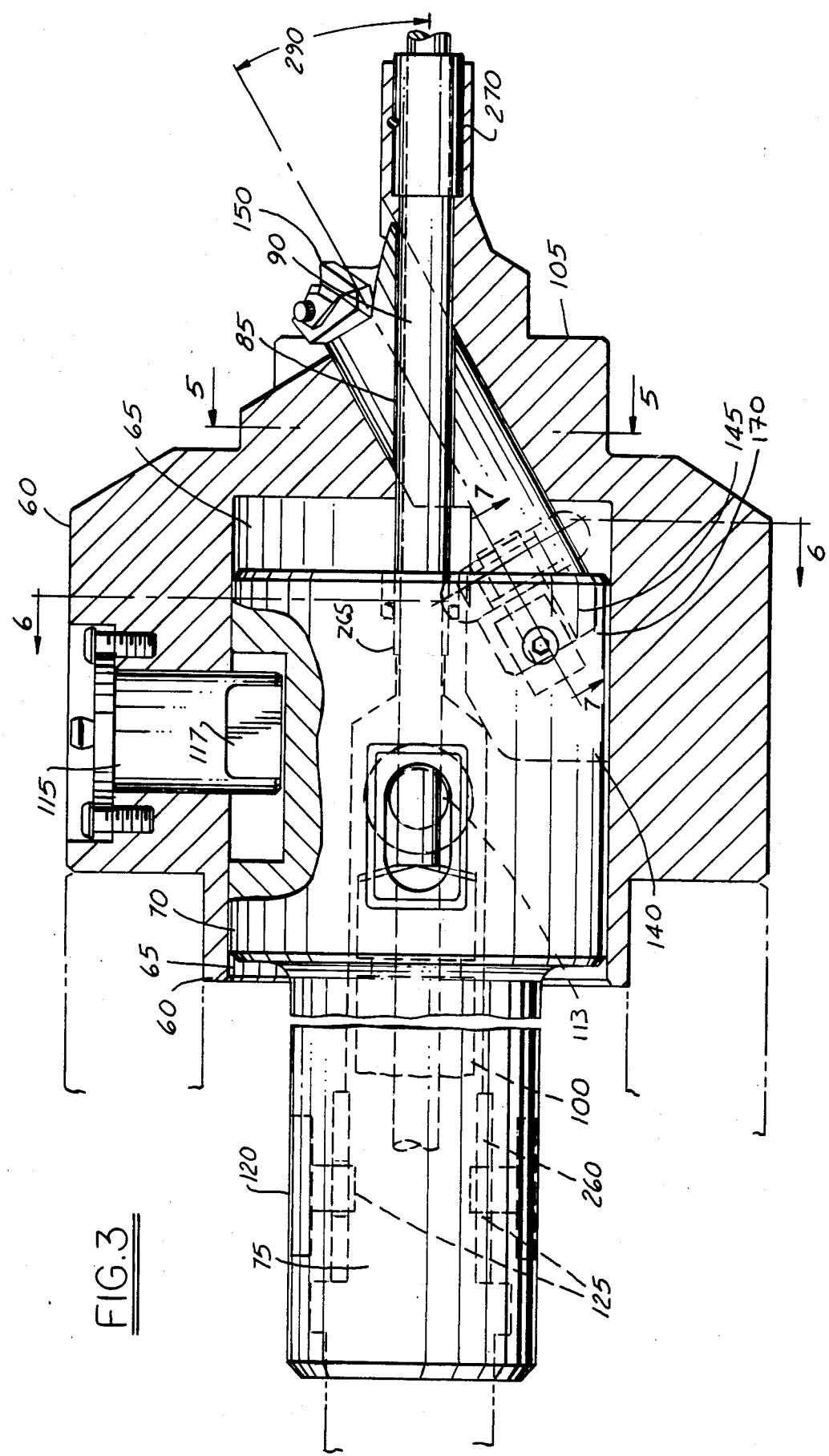
FIG. 3 is a section view of the cutting tool taken along section line 3—3 of FIG. 2 showing the actuating bar in its home position.
Figure 5:
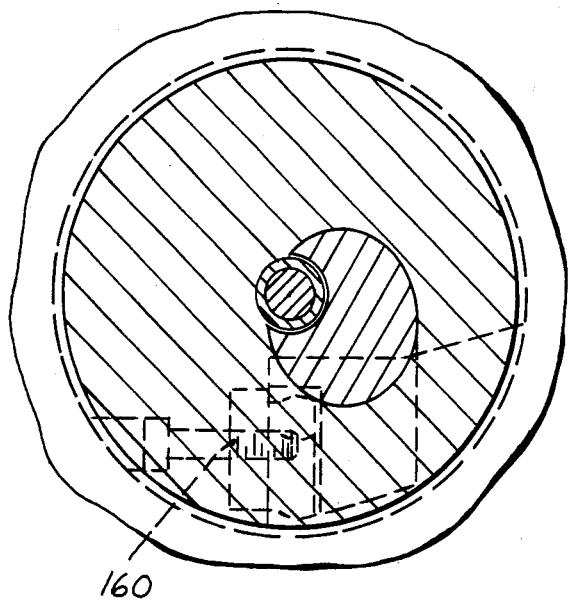
FIG. 5 is a cross-sectional view of FIG. 3 taken along line 5—5.
Figure 6:
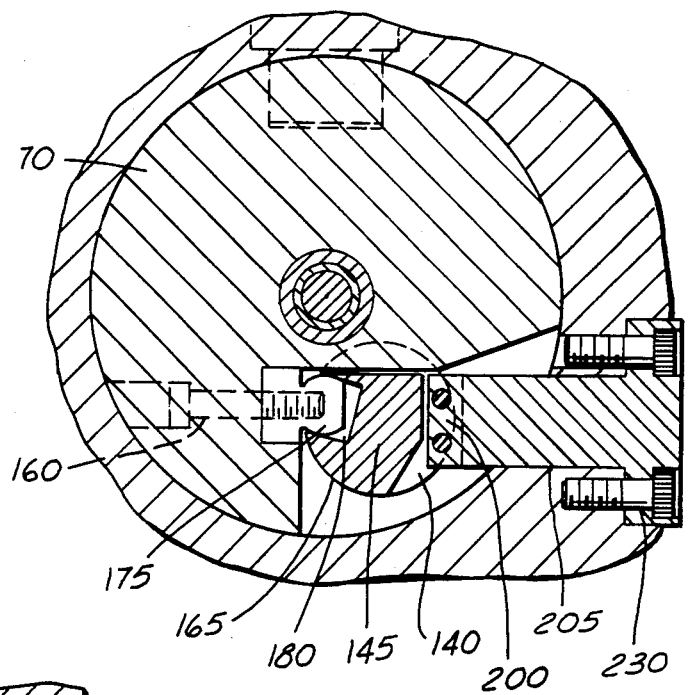
FIG. 6 is a cross-sectional view of FIG. 3 taken along line 6—6 showing the position of the shank in its home position.

FIGS. 2 and 3 illustrate the rotary cutting tool 5 of FIG. 1 in greater detail and rotary housing 60 and first longitudinal recess 65. Within housing 60 and more particularly first longitudinal recess 65, an actuating bar 70 concentric with rotary axis 75 is slidably guided. The actuating bar 70 is keyed to the rotary slide as discussed above by methods known in the art so to permit both axial and rotational movement.

The actuating bar 70 is bored axially at 85 for receipt of a reamer bar 90. Reamer bar 90 has a forward cutting portion (not shown) which extends from a support shank 100 in actuating bar 70 forwardly through reamer bore 85, and the forward end 105 of rotary housing 60. The supportshank holds the reamer bar 90 fixed by means of a threaded collet 110. Rotary housing 60 and actuating bar 70 are also bored at 113 in a direction normal to axis 75 to permit access to collet 110 through housing key 115 for removal.

Actuating bar 70 is bored at 120 and 123 where it is threaded for engagement with screws or pins. The screws thread through the bores and seat in recess portions 125 of support shank 100 keying reamer bar 90 to actuator bar 70.

In operation, actuating bar 70 is driven axially in response to drawbar movement initiated by auto size module 35 and rotationally by spindle 20. Reamer bar 90, connected to support shank 100 by collet 110 and to actuating bar 70 through its pinned connections, allows for counterboring action on the rotation of the spindle and keyed drawbar as discussed above and rotated via support shank 100.

Figure 4:
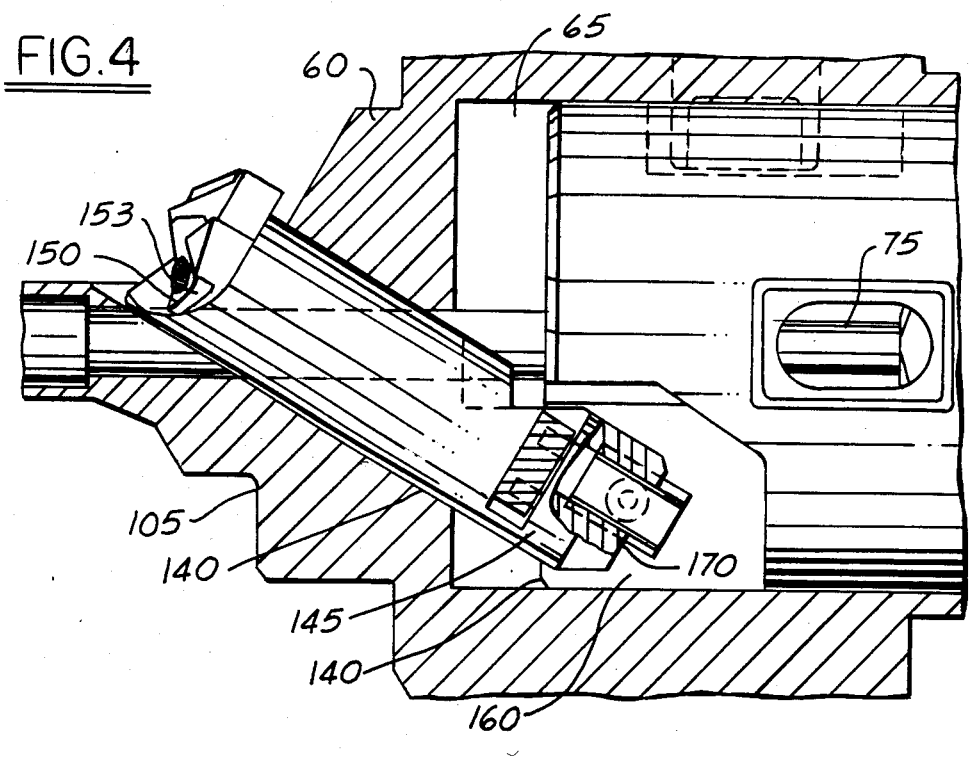
FIG. 4 is a partial section view of FIG. 2 along section line 3—3 showing the actuating bar, coupling means and shank of the cutting tool.

With regard to FIGS. 2, 3 and particularly 4, the forward end 105 of rotary housing 60 has a second cylindrical recess 140 which intersects with first longitudinal recess 65 and extends within rotary housing 60 above and below an imaginary horizontal plane (not shown) passing through rotary xis 75. A second cylindrical shank 145 with forwardly attached cutting means 150 is rotatably mounted within the second recess 140. The second shank 145 has at least one cutting means, a cutting insert 153. Although it is recognized that the cutting insert may be secured anywhere on the forward portion of the second shank, it is preferably disposed on the periphery of the second shank (see FIGS. 2 and 4) to allow for maximum radial generation 155 of the cutting insert with shank rotation (See FIGS. 8 and 9).

Referring now to FIGS. 5 to 10, longitudinal actuating bar 70 movement is translated into rotational movement of second shank 145 via a coupling mechanism shown generally on 160. The mechanism is provided on the forward portion of the actuating bar 70 and is mated with an engaging means 165 on the rearward portion 170 of the second shank 145.

One particular mechanism for translating longitudinal movement into rotational movement comprises and may be employed in the subject invention. A ball head male portion 175 (see FIGS. 5, 6) which is fixed to actuating bar 70 in a direction normal to a vertical plane parallel with axis 75. Engaging means 165 illustrated preferably comprises a ball socket recess portion 180 adapted to receive the ball headed male portion 175. Highly precise cutting may be accomplished by this method to within a range of about 5 minutes.

Figure 7:
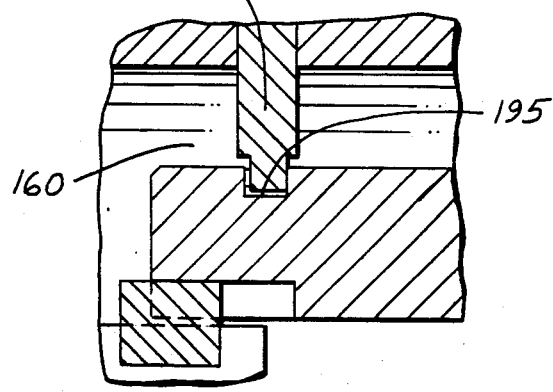
FIG. 7 is a partial sectional view taken from FIG. 3 along lines 7—7 of the cutting tool.

In another embodiment, illustrated in FIG. 7, coupling means 160 comprises a fixed rod 190 grooved for slidable retention. Engaging means 165 comprises an inclined slot 195, shaped for mating receipt with the fixed rod allowing the coupling means 160 a range of motion sufficient to rotate shank 145 at least about 90°. Axial motion imparted to the actuating bar 70 forces the rod against the inclined plane of slot 195 thereby imparting a tangential force component on its periphery initiating rotational movement.

In a further embodiment (not shown) a grooved activating bar threadingly engages the outer periphery of the tubular sleeve portion of the tool shank resulting in shank rotation. The grooved mating portions of the coupling and engaging means allow for gear-like rotation in a clockwise or counter-clockwise direction in accordance with forward or reverse longitudinal bar motion. The mechanism for translating longitudinal movement into rotational movement are presented by way of example and should not be construed as a limitation to the subject inventor.

Referring herein again to FIGS. 6 and 10, the second shank 145 is retained within second recess 140 by means of a clamping bar 200 permitting a controlled range of motion. Actuating bar 70 is bored radially at 205 (See FIG. 2) extending from the periphery of recess 148 to the periphery 230 of actuating bar 70. Clamping bar 200 is substantially cylindrical in shape and dimensional for receipt in radial bore 205. Clamping bar 200, illustrated in FIG. 10 includes faces 215, 220, and 225. Clamping bar 200 is fixed perpherally at 230 by bolts or screws to allow for unrestricted motion of actuating bar 70 within first longitudinal recess 65. Clamping bar 200 abuts second shank 145 at slotted recessed portion 240. Faces 215, 220 and 225 of clamping bar 200 abut against recessed planar faces in shank 145 of 245, 250 and 255 respectively. These faces restrict premature removal of second shank 145 during operation, yet permit a controlled range of rotational movement. Axial movement is restricted by the abutment of clamping bar face 225 against the vertical wall face 255, formed in shank 145 by the recessing of faces 245 and 250. Rotational generation ceases when clamping bar face 220 contacts shank face 250 or when face 215 contacts shank face 245.

Turning now to FIG. 3, actuating bar 70 may be held centered within spindle 20 by a bushing (not shown)

threaded to the rear portion of spindle 20. The positioning of the bushing within spindle 20 is dependent in part upon the length of the spindle. Referring now to FIG. 2, actuating bar 70 is also centered by a second bushing 260 positioned at the rearward end of first longitudinal recess 65 and is threadingly engaged thereto. Reamer bar 90 is supported by a third bushing 265 threaded to the forward end 105 of rotary housing 60 and a fourth bushing 270 threaded to the most forward section of rotary housing 60.

Regarding FIGS. 2 and 3, the bushings depicted therein include bearings known in the art and comprise an inner and outer face having a ball or roller therebetween. In such bearings, the ball and face adjacent the moving part, rotate during operation of the apparatus. The use of such bushings, however, is by way of example only.

Several factors contribute toward minimizing vibration and therefore tool accuracy. For example, in order to optimize balance conditions in the tool holder, the mass of shank 145 is positioned equally above and below an imaginary horizontal plane passing through axis 75.

The diameter and orientation of the shank also contributes toward achieving preferred balance conditions. Larger diameter shanks and bores oriented at steep angles relative to the axial plane necessarily reduce the structural integrity of the forward portion 105 of the rotary housing 60 due to the absence of housing material. Small diameter shanks and bores, however, oriented at a smaller angle with respect to the axial plane, fail to allow for adequate generation distance. While the preferred bore and shank size is generally dependent on the specifications of the finished work piece, the preferred orientation of shank 145 forms an angle 290 with respect to the plane through axis 75 of between about 20° and about 40°. At angles greater than 40° and less than 20° the range of generation is diminished.

Figure 8:
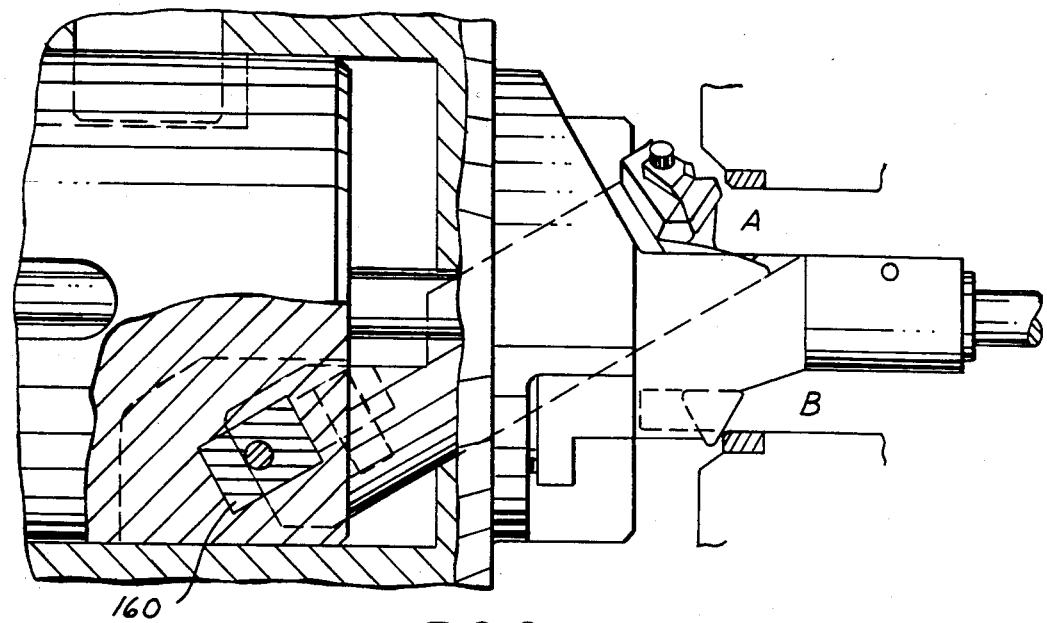
FIG. 8 is an illustration in section of the cutting tool and inserts A and B in relation of the valve seat.
Figure 9:
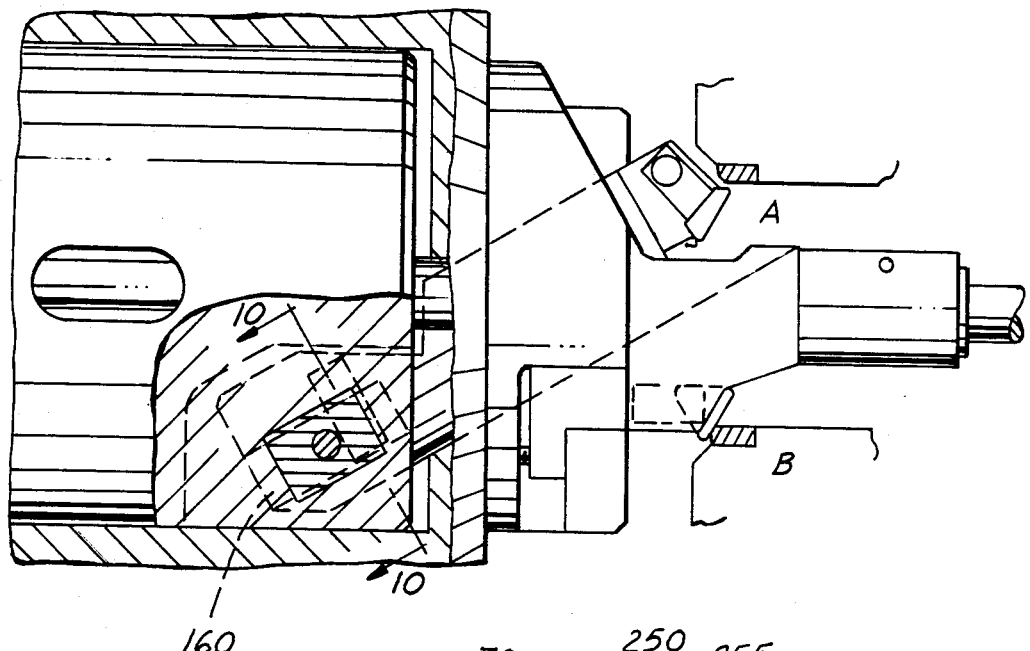
FIG. 9 is an illustration in section of the cutting tool and inserts A and B after completion of cutting the valve seat.
Figure 10:
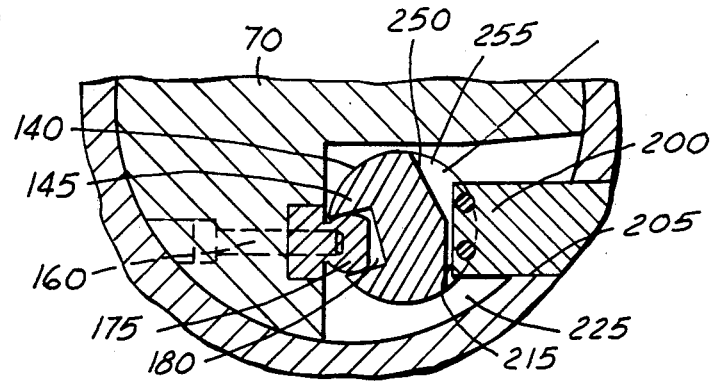
FIG. 10 is a partial cross-sectional view of FIG. 9 taken along line 10—10 showing the position of the shank in its forward position.

In operation, rotary housing 60, driven by spindle 20, rotates second cylindrical shank 145 and appended cutting means 150, circumscribing a cutting diameter dependent upon the angle of the shank 145 and the distance generated by the rotation of shank 26 (See FIGS. 8 and 9).

The accuracy of the subject invention depends in part on the accuracy of the drive means used in actuator bar movement. Several methods of driving actuating bars are known in the art. The auto size module 35 depicted in FIG. 1, for example, is produced by GTE and in conjunction with the tool holder above is capable of generating an angle with tolerances within about 5 minutes and reproducing it repeatedly in a range of between about 0.10 to about 0.25 microns.

The machine tool of the present invention can be used in a closed loop system if desired. Referring to FIG. 1, and step motor 40 represents a stepper motor coupled to an encoder 25. The motor 40 and encoder 25 may be coupled to a controller (not shown), as, for example, a controller of the type disclosed in U.S. Pat. No. 4,268,783. Such combined structure is useful in assuring predetermined radial movement of cutting inserts as described herein. The use of an encoder in cutting applications is known in the art and will not be discussed further. However, it is noted that a useful encoder is available through PMI Motors, a division of Kollmorgen Corporation.

The embodiments which have been described herein are but some of several which utilize this invention and are set forth here by way of illustration but not of limitation. It is apparent to those skilled in the art that variation may be made without departing materially from the spirit and scope of this invention.

What is claimed is:

1. A rotary cutting tool comprising:
   a housing rotatable about an axis having a first longitudinal recess concentric with said axis and guide means therein,
   a second recess intersecting said first recess and extending outwardly therefrom,
   an actuating bar longitudinally mounted in said first recess,
   said bar having forwardly disposed coupling means,
   a tool shank rotatably mounted in said second recess having forwardly disposed cutting means and rearwardly disposed engaging means,
   means for retaining said rotatable shank in said second recess to prevent premature removal,
   said engaging means mated with said coupling means to communicate axial actuating bar movement to said shank for radial generation of said cutting means.

2. A cutting tool according to claim 1 wherein said forward coupling means is a ball head rod positioned for receipt within a mating socket engaging means.

3. A cutting tool according to claim 1 wherein said engaging means is an inclined slot.

4. A cutting tool according to claim 1 wherein said engaging means is an inclined slot.

5. A rotary cutting tool comprising: a housing rotatable about an axis having a first longitudinal recess concentric with said axis and guide means therein,
   a second recess intersecting said first recess and extending outwardly therefrom,
   an actuating bar longitudinally mounted in said first recess,
   said bar having a forwardly disposed coupling rod positioned in a direction normal to the rotational axis,
   a tool shank rotatably mounted in said second recess having forwardly disposed cutting means and rearwardly disposed engaging means,
   means for retaining said shank rotatably in said second recess to prevent premature removal,
   said engaging means comprising an inclined slot for mating receipt with said coupling rod which when mated communicates axial actuating bar movement to said rotatable shank for radial generation of said cutting means.

6. A cutting tool of claim 5 wherein said coupling rod is grooved for slidable retention within said inclined slot for reversible rotation of said shank.

7. A method for generating a rotary cutting tool comprising:
   displacing an actuating bar axially within a first recess of a rotary housing to a second recess extending outwardly therefrom,
   communicating said axial bar displacement through a coupling means forwardly mounted on said bar to a mated engaging means rearwardly positioned on a shank rotatably mounted within said second recess, said shank housing a forwardly disposed cutting means,
   restraining axial shank movement from said second recess during rotation of said housing, and
   driving said mated forward coupling means and rearward engaging means axially causing rotation of said shank and radial generation of said cutting means.

* * * * *